US006544623B1

(12) United States Patent
Straza

(10) Patent No.: US 6,544,623 B1
(45) Date of Patent: Apr. 8, 2003

(54) HONEYCOMB CELL STRUCTURE AND METHOD OF MANUFACTURE

(76) Inventor: George C. P. Straza, 6617 Remsen Ct., Carlsbad, CA (US) 92009

( * ) Notice: Subject to any disclaimer, the term of this patent is extended or adjusted under 35 U.S.C. 154(b) by 124 days.

(21) Appl. No.: 09/726,236

(22) Filed: Nov. 29, 2000

(51) Int. Cl.[7] .................................................. B32B 3/12
(52) U.S. Cl. ....................... 428/116; 428/117; 428/593; 228/181; 219/85.1; 219/85.22; 219/78.11; 219/78.12; 29/896.6; 29/897; 29/428
(58) Field of Search ........................... 428/116–118, 73, 428/593; 228/181; 29/896.6, 897, 428; 219/85.1, 85.22, 78.11, 78.12

(56) References Cited

U.S. PATENT DOCUMENTS

| 4,333,598 A | 6/1982 | Ittner et al. |
| 4,411,381 A | * 10/1983 | Ittner et al. |
| 4,477,012 A | 10/1984 | Holland |
| 4,491,265 A | 1/1985 | Ittner et al. |
| 5,380,153 A | 1/1995 | Campbell |

FOREIGN PATENT DOCUMENTS

| EP | 0 437 626 A1 | 7/1991 |
| JP | 7185792 A | 7/1995 |

* cited by examiner

Primary Examiner—Deborah Jones
Assistant Examiner—Wendy Boss
(74) Attorney, Agent, or Firm—Brown, Martin, Haller, Haller & McClain LLP

(57) ABSTRACT

A honeycomb cell structure has a plurality of first strips each formed into a generally zig-zag configuration and placed side by side to form a plurality of rows of cells in a generally honeycomb configuration with nodes between adjacent cells in each row, and a plurality of second strips of brazing foil. Each second strip is positioned between a respective pair of adjacent first strips and the first and second strips are secured together at each node such that a brazing foil strip extends across each cell in each row of the honeycomb. The second strips have a series of spaced slits extending transversely from at least one side edge across at least a distance equal to greater than half of the width of the second strip, with at least some of the slits being located within the cells.

10 Claims, 3 Drawing Sheets

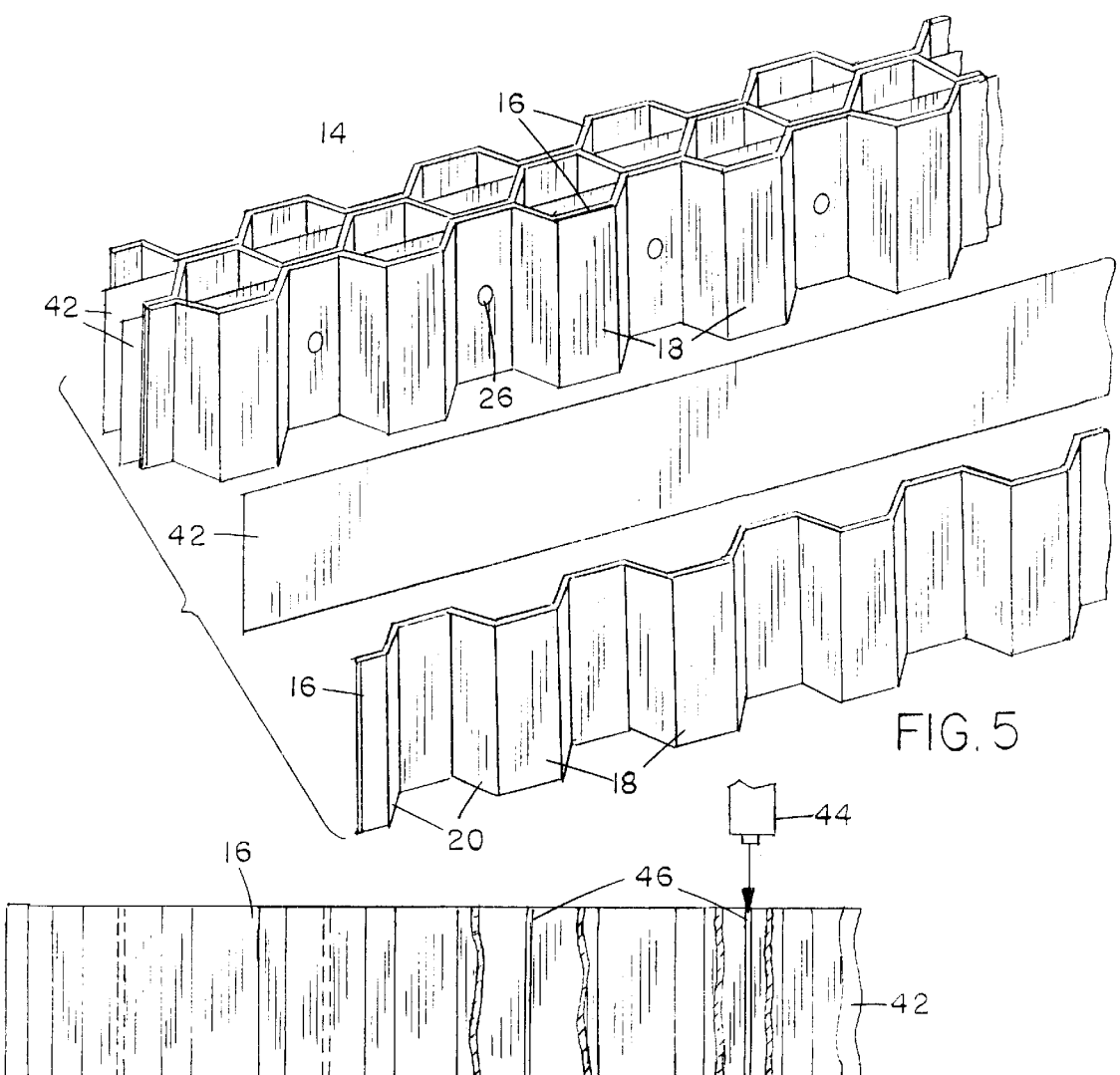
FIG. 5
FIG. 6
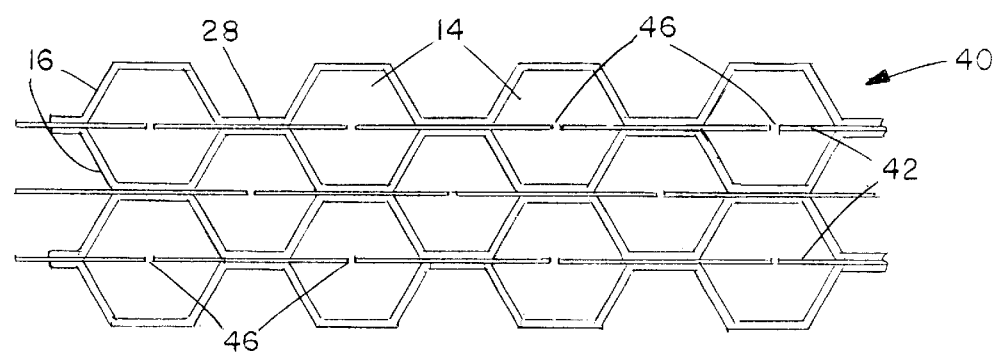
FIG. 7

HONEYCOMB CELL STRUCTURE AND METHOD OF MANUFACTURE

BACKGROUND OF THE INVENTION

The present invention relates generally to honeycomb cell materials or structures and a method of manufacture of such material.

Honeycomb cell structures are commonly used as seals in jet aircraft and other industrial applications. The honeycomb structure must normally be bent into a diameter to form a jet engine seal since regions in jet engines to be sealed are normally round, such as the outer periphery of a turbine. The honeycomb core or cell material is typically formed of stainless steel or other high temperature metal alloys, and is brazed to a backing strip or mounting ring. Brazing of honeycomb cell structures to a backing strip is normally carried out using brazing powder or brazing tape. However, such a technique is subject to errors and inconsistencies due to the fact that there is no consistency in the amount of brazing powder used. Excessive amounts will cause some wicking into the cell walls and thicker joint areas in some regions, and can even create filled cells. If too little brazing powder is used, an insufficient joint may be provided in some areas of the assembly.

Honeycomb cell structures have been proposed in the past which have a brazing foil or strip incorporated into the honeycomb cells. For example, U.S. Pat. No. 4,491,265 of Ittner describes manufacture of a honeycomb cell array with embedded strips of corrugated brazing foil. In order to form a honeycomb cell array, strips of metal are formed into zig-zag shapes and then welded together at their nodes to form a series of generally hexagonal cells. Ittner's method involves placing a corrugated brazing foil strip between adjacent metal strips and welding it in place at the nodes. The brazing foil strips within the honeycomb will then function to braze the honeycomb assembly to panels or other structures. However, this structure is very rigid, due to the I-beam effect of the brazefoil between the hex cells. The resultant cell structure cannot be bent into a diameter, and it is therefore completely unsuitable for forming engine seals and the like.

SUMMARY OF THE INVENTION

It is an object of the present invention to provide a new and improved honeycomb cell assembly incorporating brazing foil strips within the cell structure.

It is a further object of the present invention to provide a new and improved method of manufacturing a honeycomb cell structure with embedded brazefoil.

According to one aspect of the present invention, a honeycomb cell structure is provided, which comprises a plurality of first strips each formed into a generally zig-zag configuration and placed side by side to form a plurality of rows of cells in a generally honeycomb configuration with nodes between adjacent cells in each row, and a plurality of second strips of brazing foil, each second strip being positioned between adjacent first strips and the first and second strips being secured together at each node such that the foil strip extends across each cell of the honeycomb, and each second, brazing foil strip having opposite side edges and a predetermined width between the side edges, and having a series of spaced slits extending transversely from at least one side edge across at least a distance equal to greater than half of the width of the second strip, at least some of the slits being located within respective cells of the honeycomb.

In an exemplary embodiment of the invention, at least one slit is located in each cell of the honeycomb structure or at least every other cell in each row of the honeycomb. The brazing foil has alternating slits extending from opposite side edges in an exemplary embodiment, with each slit extending across a distance between ⅝ and ¾ of the foil width. In an alternative embodiment, the foil strip is split completely across its width in each cell, to form two completely separate portions in each cell. In each case, the slits or splits in the foil strip will make the resultant honeycomb structure more flexible, so that it can be bent to adopt a desired diameter or conform to the intricate design of a jet turbine engine. At the same time, the honeycomb structure has all the advantages of having a built-in brazing foil so that it can be directly brazed to a desired backing strip, avoiding the need to use brazing powder or a separate brazing tape.

Another advantage of incorporating brazing foil with slits or splits into the honeycomb cell structure, as compared with a conventional brazefoil honeycomb which has no slits, is that there will be less stress on the brazing foil strips, producing a more accurate arid uniform braze. Conventional brazefoil honeycomb tends to distort, flex or bow by a significant amount when heated during brazing, due to the stress on the brazing foil. This invention provides slits or splits in the brazing foil strip, in every cell or at least every other cell, removing the stress on the foil which may otherwise cause distortion of the honeycomb structure during brazing.

According to another aspect of the present invention, a method of making a brazefoil honeycomb structure is provided, which comprises the steps of:

forming a plurality of first strips into a generally zig-zag configuration such that each side face of each strip forms one side of a respective row of honeycomb cells separated by nodes;

positioning a pair of strips face-to-face at a first spacing;

placing a second strip of brazing foil between the pair of first strips;

bringing the first and second strips together such that the second strip is sandwiched between the pair of first strips and extends across the cells formed between the strips;

securing the first and second strips together at the nodes; and repeating the preceding four steps until a honeycomb structure of predetermined dimensions is formed;

each second strip having a plurality of spaced slits along its length, each slit extending transversely across the strip for a distance equal to at least greater than the width of the strip.

In a first embodiment of the invention, spaced slits are formed in the second strips prior to assembly in the honeycomb structure, with the slits extending alternately from opposite side edges of the strip and being at a predetermined spacing such that at least one slit is located in at least every second cell in each row. In an exemplary embodiment, one slit is located in every cell in the honeycomb.

In an alternative method, slits are formed in the second strips after assembly into the honeycomb structure, by means of a laser cutting machine or the like. In this alternative, the second strip may be cut completely across its width in each cell, so that two completely separate brazing foil sections are provided in each cell. This increases flexibility and improves uniformity of the braze.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 5 is a perspective view of an alternative configuration of the structure;

FIG. 6 is aside view of the structure of FIG. 5, partially cut away to show the slitting of the webs after assembly; and FIG. 7 is a top view of the structure of FIG. 6.

DETAILED DESCRIPTION OF THE DRAWINGS

Figure 1:
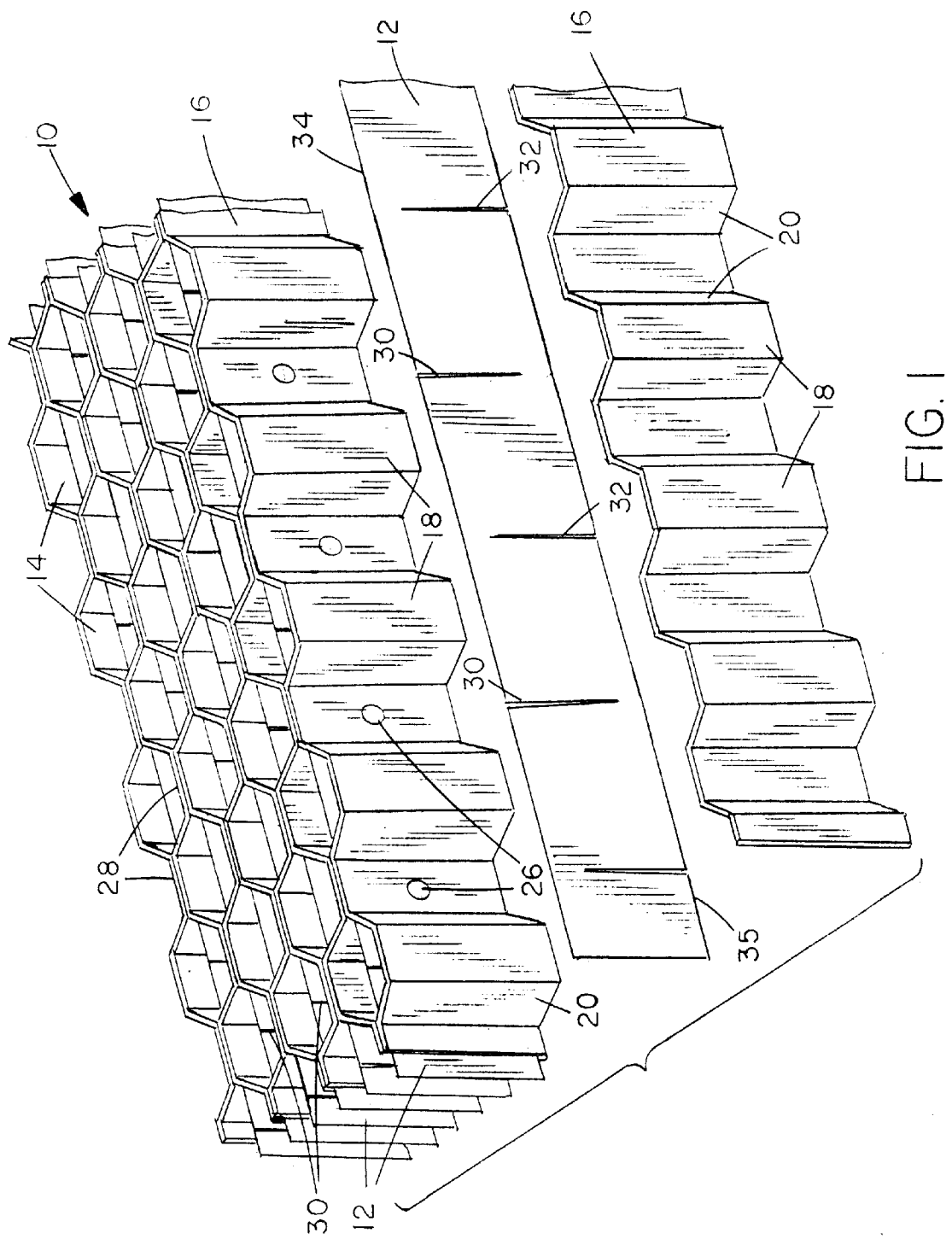
FIG. 1 is a perspective view of a section of honeycomb according to a first embodiment of the invention with elements separated to show the structure.
Figure 2:
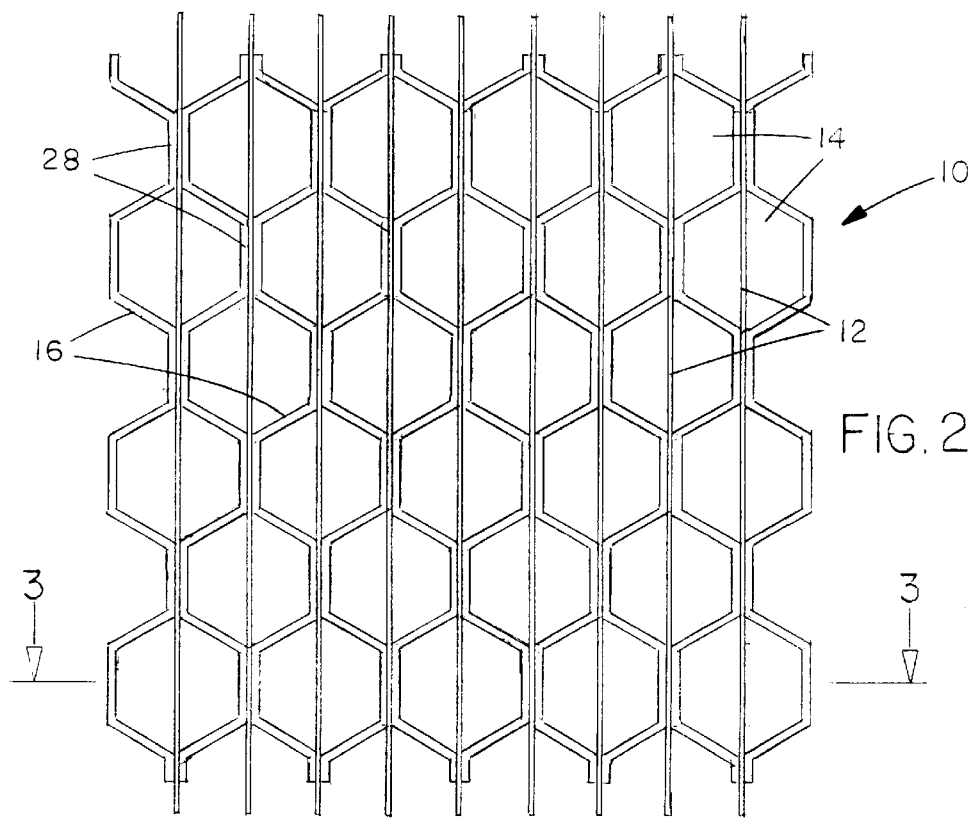
FIG. 2 is a top view of the honeycomb structure.
Figure 3:
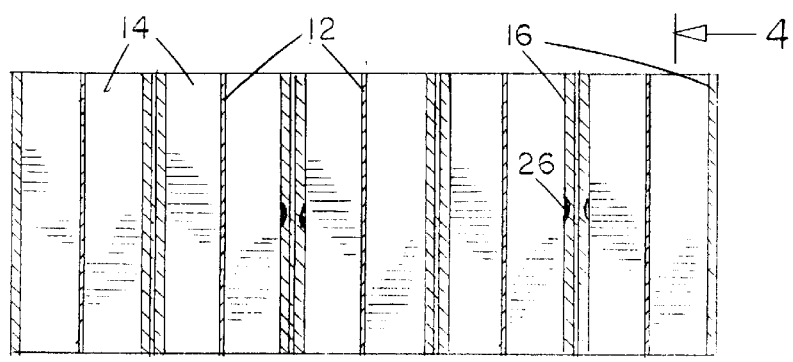
FIG. 3 is a sectional view taken on line 3—3 of FIG. 2.
Figure 4:
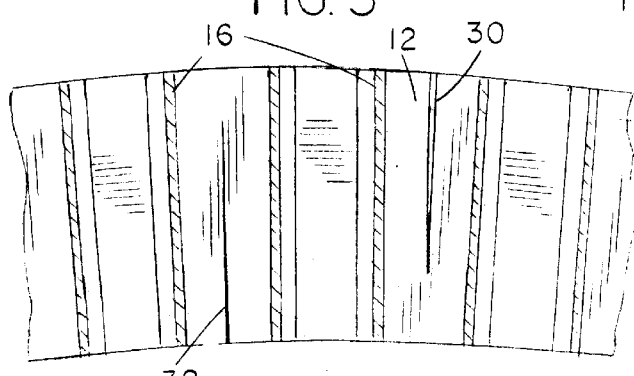
FIG. 4 is a sectional view taken on line 4—4 of FIG. 3, showing the curvature made possible by the structure.

FIGS. 1 to 4 illustrate a honeycomb cell structure 10 with embedded brazing foil strips 12 according to a first embodiment of the present invention. The honeycomb structure, as best illustrated in FIG. 2, comprises a series of hexagonal shaped cells 14 arranged to form a honeycomb shape. The honeycomb is formed using metal strips 16 of predetermined height or transverse width, depending on the desired honeycomb height, with each strip being formed into a repeating zig-zag shape comprising parallel, staggered flat faces 18 connected by inclined faces 20.

Pairs of oppositely directed strips 16 are placed face to face with a brazing foil strip 12 between each adjacent pair, as indicated in FIG. 1, and the strips 16 are then brought together to sandwich the brazing foil strip 12 between them, with the opposing flat faces 18 aligned and welded to one another through the brazing foil at weld points or spot welds 26 to form nodes 28 between adjacent cells in each row. Although each of the cells 14 is of hexagonal shape in the illustrated embodiment, it will be understood that the cells may be of other shapes if desired, such as arcuate or eye-shaped cells formed by metal strips each having a sine wave like shape, or square shapes, in which each strip is formed by alternating, generally V-shaped zig zags with no inner and outer flat faces.

As best illustrated in FIG. 1, the brazing foil strips 12 are each of a transverse width substantially equal to that of the zig-zag strips 16, and are substantially flat or straight with alternating, spaced slits 30,32 extending from the opposite side edges 34,35, respectively, of each strip. Each slit 30,32 extends across more than half of the width of the brazing foil strip, such that the alternating slits overlap as indicated. In an exemplary embodiment, each slit extends across a distance equal to ⅝ to ¾ of the width of the strip. In other words, if the strip width is w, the slit length is between 0.6 w to 0.75 w. The slit spacing and the position of strip 12 relative to the zig-zag strips is such that at least one slit is located in each cell, and the slits alternate from one side edge and the opposite side edge in adjacent cells. Although a slit is located in each cell in the illustrated embodiment, it may also be possible to provide a slit in every second cell in some cases. In other alternative examples, the slit spacing may be reduced such that more than one slit is located in each cell.

The cell size is suitably in the range from ⅛" to 1/32", with honeycombs being provided in three different cell sizes of ⅛", 1/16", and 1/32". The spacing between adjacent slits may be of the order of 0.01" or less, depending on the cell size. The actual slit position in each cell does not have to be exactly at the center of the cell as indicated in the drawings, but the slits may be more randomly distributed along the cells as long as, on average, at least one slit is located in each cell.

The honeycomb cell structure of FIGS. 1 to 4 will be brazed to a backing strip prior to installation as a seal in a jet engine or the like. The provision of slits in the brazing foil strips has been found to improve the brazing process, ensuring that the honeycomb will braze properly to the backing strip. In prior brazefoil honeycombs having embedded brazing foil, it has been found that stress points will arise in the honeycomb as it is heated during brazing, causing the structure to deform such that it lifts or contracts by different amounts in different regions. As a result, the honeycomb will not braze properly to the backing strip. In this invention, it has been found that the provision of overlapping slits extending across more than half of the width of the brazing foil strips will relieve the stress and reduce the risk of deformation and improper brazing of the honeycomb. The braze material will melt at the slits first, enabling capillary action or surface tension to pull the braze material towards the joints of honeycomb and base material. This has been found to produce brazed joints between the cell walls and backing strip which have very clean interfaces with no significant erosion of the base metal or wicking or mushrooming of the braze alloy at the joint. Instead, each joint in cross-section has a substantially clean and sharp, generally T-shaped structure, due to the uniform and reliable melting of the brazing foil along its length.

Another advantage of the honeycomb cell structure of FIGS. 1 to 4 is that it will be much more flexible, so that it can be bent to form any desired round shape to be brazed to a backing strip in a cylindrical configuration, as is required in jet engine seals. This is also due to the slits in the brazing foil strips, which extend past the center of the foil strip and overlap, making the honeycomb much more pliable and substantially stress free even when the honeycomb is bent to adopt a curvature matching that of a backing strip prior to brazing. The offset slits extending across more than half of the width of the strip make the honeycomb pliable enough to be rolled into a small diameter and to be formed into the intricate design of a seal for a jet turbine engine.

FIGS. 5 to 7 illustrate a honeycomb cell structure 40 and method of manufacture according to another embodiment of the invention. Some parts of the structure 40 are identical to those of the first embodiment, and like reference numerals have been used for like parts as appropriate. As in the first embodiment, the structure 40 is made by placing strips 42 of brazing foil between adjacent pairs of zig-zag strips 16 identical to those of the first embodiment. However, unlike the first embodiment, the brazing foil strips 42 are not slit prior to assembly in the honeycomb. Instead, the unslit strips 42 are positioned between successive pairs of zig zag strips 16, the strips are brought together until spaced regions of strip 42 are sandwiched between the strips at the nodes 28 between cells 14, and the strips 16 and brazing foil strip 42 are welded together by spot welds 26 as in the first embodiment.

After each spot weld 26 is made, a laser cutting device 44 is used to form a cut 46 across the entire width of strip 42 in the preceding cell 14. The laser cutting device 44 is controlled by a suitably programmed computer to form a cut 46 across the strip 42 in each cell of the structure. The cuts 46 are preferably formed approximately at the center of each cell, after each weld 26 is made, so that the brazefoil strip 42 in each cell is split into two separate halves, as indicated in FIG. 7.

This embodiment provides a honeycomb structure with embedded brazing foil which is even more flexible and less likely to develop stress points than the previous embodiment, although it will be slightly more expensive to manufacture. This version will therefore have all of the advantages of the first embodiment, with improved flexiblity and relief of stress during brazing to a backing strip.

The honeycomb cell structure and method of this invention has several advantages over conventional honeycomb with embedded brazing foil strips. The conventional brazefoil honeycomb is very rigid, due to the I-beam nature of the joint between the brazing foil strips and the cell-forming strips. This makes it virtually impossible to form such honeycomb into arcuate shapes, as required in the jet engine industry. A second problem arises during brazing. As the honeycomb is heated in order to melt the brazing foil and form a braze joint with the backing strip, stress in the brazing foil will cause the honeycomb to distort, resulting in braze inconsistency.

The slits or splits in the brazing foil strips in the honeycomb of this invention will make the structure much more flexible, so that it can adopt any desired round or arcuate shape as generally required for jet turbine engine seals. The flexibility of the honeycomb structure allows for easy application in many aeronautic applications such as turbine rubbing seals. Additionally, the slits or splits in the foil will avoid development of stress points, allowing good, continuous contact of the honeycomb with the substrate or backing strip as brazing is taking place. This results in a more uniform and accurate braze. As the temperature is increased during brazing, the braze material will start to melt at the slits or splits first, enabling capillary action to pull the melted braze material towards the joints between the honeycomb and backing material. The braze material will be more uniformly distributed along the joint, with a thin line of braze material around the internal edges of each cell, rather than the inconsistencies of using braze tape or braze powder, which were common in prior art braze joints.

The reduction in the amount of braze material required with this structure will reduce overall weight of seals throughout an engine where honeycomb seals are used. Since this arrangement requires less braze alloy than brazing using braze tape or powder, it will reduce or eliminate waste of braze alloy. The honeycomb structure will also produce more reliable melting and flow of the brazing material, as well as avoiding any lifting or contracting of the honeycomb during brazing. This will reduce the number of rejects as a result of inconsistent brazing, reducing manufacturing expense, and will produce more consistent, uniform braze joints of improved performance and lifetime. The use of exactly the correct amount of brazing material which is embedded in the cell structure, and providing slits in the brazing foil to avoid build-up of any stress points in the structure, will reduce the risk of excessive wicking up from the braze joints or potential filling up of cells, which was a common problem in prior art honeycomb braze joints.

Although some exemplary embodiments of the invention have been described above by way of example only, it will be understood by those skilled in the field that modifications may be made to the disclosed embodiments without departing from the scope of the invention, which is defined by the appended claims.

I claim:

1. A honeycomb cell structure, comprising:
    a plurality of first strips each formed into a generally zig-zag configuration and placed side by side to form a plurality of rows of cells in a generally honeycomb configuration with nodes between adjacent cells in each row;
    a plurality of second strips of brazing foil, each second strip being positioned between a respective pair of adjacent first strips and the first and second strips being secured together at each node such that each brazing foil strip extends across each cell in a respective row of the honeycomb; and
    each second, brazing foil strip having opposite side edges and a predetermined width between the side edges, and having a series of spaced slits extending alternately from opposite side edges of the strip and transversely across a distance equal to greater than half of the width of the second strip and less than the width of the strip, at least some of the slits being located within respective cells of the honeycomb.

2. The structure as claimed in claim 1, wherein at least one slit is located in at least every second cell along each row of the honeycomb.

3. The structure as claimed in claim 2, wherein at least one slit is located in each cell of the honeycomb.

4. The structure as claimed in claim 1, wherein each slit extends across a distance between ⅝ and ¾ of the foil width.

5. The structure as claimed in claim 1, wherein each cell has a transverse dimension in the range from 1/32" to ⅛".

6. A honeycomb cell structure, comprising:
    a plurality of first strips each formed into a generally zig-zag configuration and placed side by side to form a plurality of rows of cells in a generally honeycomb configuration with nodes between adjacent cells in each row;
    a plurality of second strips of brazing foil, each second strip being positioned between a respective pair of adjacent first strips and the first and second strips being secured together at each node such that each brazing foil strip extends across each cell in a respective row of the honeycomb;
    each second, brazing foil strip having opposite side edges and a predetermined width between the side edges, and having a series of spaced slits extending transversely from at least one side edge across at least a distance equal to greater than half of the width of the second strip, at least some of the slits being located within respective cells of the honeycomb; and
    each brazing foil strip being split completely across its width in each cell, to form two completely separate brazing foil portions in each cell, each brazing foil portion extending across approximately half of the distance between adjacent nodes.

7. A method of making a brazefoil honeycomb structure, comprising the steps of:
    forming a plurality of first strips into a generally zig-zag configuration such that each side face of each strip forms one side of a respective row of honeycomb cells separated by nodes;
    positioning a pair of strips face-to-face at a spacing;
    forming a plurality of spaced slits along the length of a second strip of brazing foil, the slits extending alternately from opposite side edges of the second strip and transverse to the respective side edge, each strip extending across a distance equal to at least greater than half of the width of the strip and less than the full width of the strip;
    placing the second strip of brazing foil between the pair of first strips;
    bringing the first and second strips together such that the second strip is sandwiched between the pair of first strips at each node and extends across the cells formed between the strips;

securing the first and second strips together at the nodes; and repeating the preceding four steps until a honeycomb structure of predetermined dimensions is formed.

8. The method as claimed in claim 7, including the step of forming a sufficient number of slits in the second strip such that at least one slit is located in each cell of the honeycomb.

9. A method of making a brazefoil honeycomb structure, comprising the steps of:

forming a plurality of first strips into a generally zig-zag configuration such that each side face of each strip forms one side of a respective row of honeycomb cells separated by nodes;

positioning a pair of strips face-to-face at a first spacing;

placing a second strip of brazing foil between the pair of first strips;

bringing the first and second strips together such that the second strip is sandwiched between the pair of first strips at each node and extends across the cells formed between the strips;

securing the first and second strips together at the nodes;

repeating the preceding four steps until a honeycomb structure of predetermined dimensions is formed; and forming cuts completely across the width of each second strip after securing all the first and second strips together, with a cut provided in at least half of the cells in the honeycomb.

10. The method as claimed in claim 9, wherein a cut is made in the second strip in each cell of the honeycomb.

* * * * *